Figure 1:
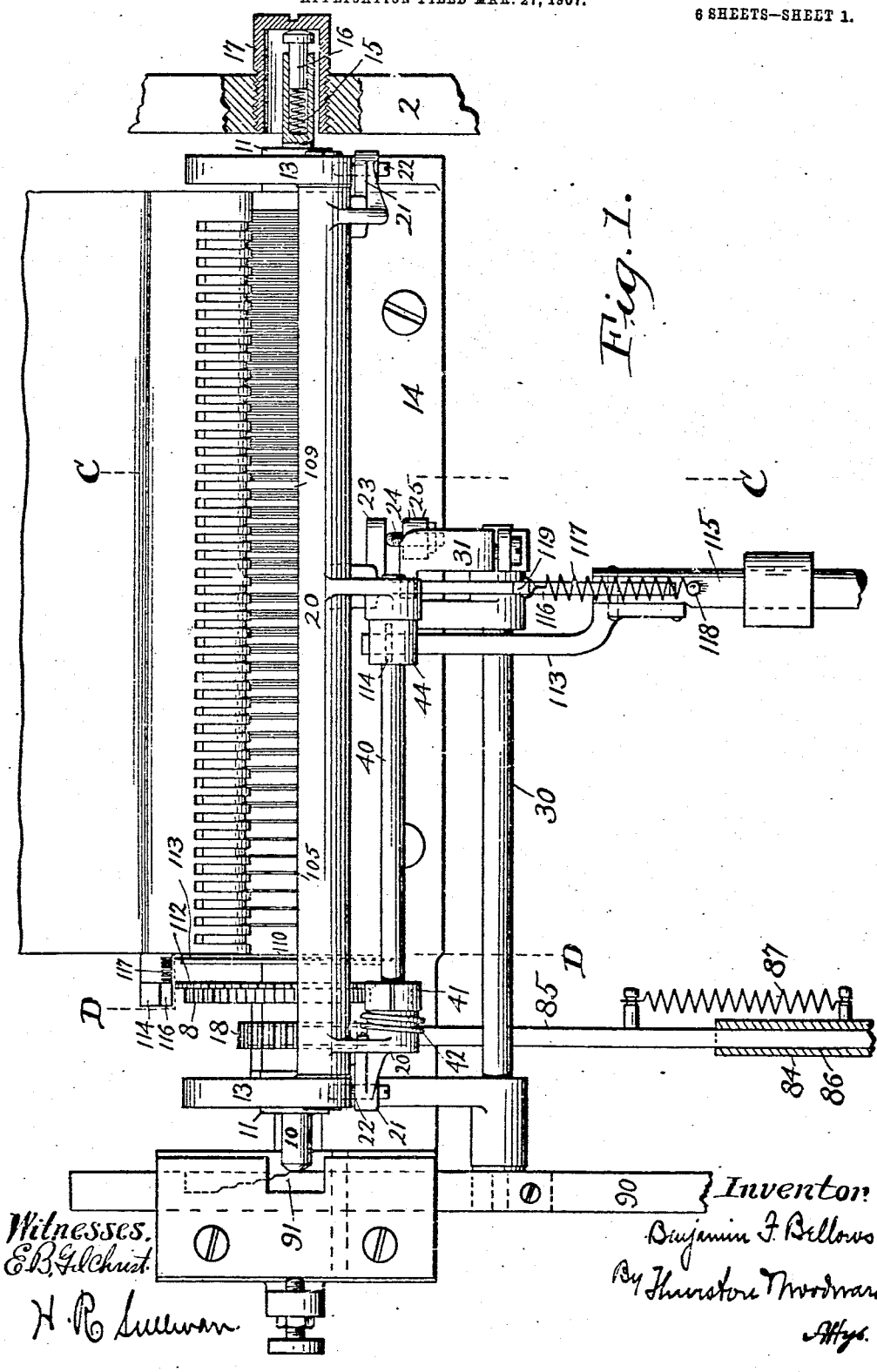

No. 895,231. PATENTED AUG. 4, 1908.
B. F. BELLOWS.
SPACER SELECTING AND RELEASING MECHANISM FOR USE IN JUSTIFYING MATRIX OR TYPE LINES.
APPLICATION FILED MAR. 27, 1907.
6 SHEETS—SHEET 1.

Fig. I.

Witnesses.
E. B. Gilchrist
H. R. Sullivan

Inventor
Benjamin F. Bellows
By Thurston Woodward
Attys.

No. 895,231. PATENTED AUG. 4, 1908.
B. F. BELLOWS.
SPACER SELECTING AND RELEASING MECHANISM FOR USE IN JUSTIFYING
MATRIX OR TYPE LINES.
APPLICATION FILED MAR. 27, 1907.

6 SHEETS—SHEET 2.

No. 895,231. PATENTED AUG. 4, 1908.
B. F. BELLOWS.
SPACER SELECTING AND RELEASING MECHANISM FOR USE IN JUSTIFYING MATRIX OR TYPE LINES.
APPLICATION FILED MAR. 27, 1907.

6 SHEETS—SHEET 3.

Witnesses
E. B. Gilchrist
H. R. Sullivan

Inventor
Benjamin F. Bellows
By Thurston Woodward
Atty

No. 895,231. PATENTED AUG. 4, 1908.
B. F. BELLOWS.
SPACER SELECTING AND RELEASING MECHANISM FOR USE IN JUSTIFYING MATRIX OR TYPE LINES.
APPLICATION FILED MAR. 27, 1907.

6 SHEETS—SHEET 5.

Witnesses.
E. B. Alchin
H. R. Sullivan

Inventor
Benjamin F. Bellows
By Thurston Woodward
Attys.

UNITED STATES PATENT OFFICE.

BENJAMIN F. BELLOWS, OF CLEVELAND, OHIO, ASSIGNOR TO ELECTRIC COMPOSITOR COMPANY, OF NEW YORK, N. Y., A CORPORATION OF NEW JERSEY.

SPACER SELECTING AND RELEASING MECHANISM FOR USE IN JUSTIFYING MATRIX OR TYPE LINES.

No. 895,231.     Specification of Letters Patent.     Patented Aug. 4, 1908.

Application filed March 27, 1907. Serial No. 364,757.

*To all whom it may concern:*

Be it known that I, BENJAMIN F. BELLOWS, a citizen of the United States, residing at Cleveland, in the county of Cuyahoga and State of Ohio, have invented a certain new and useful Improvement in Spacer Selecting and Releasing Mechanism for Use in Justifying Matrix or Type Lines, of which the following is a full, clear, and exact description.

In the prior patents No. 727,267 and No. 797,549 granted to B. F. Bellows, one of the applicants herein, and also in the pending application of the said Bellows, Serial No. 330,685, filed August 15, 1906, a so-called selecting plate is shown as the means for immediately selecting and operating the proper combinations of escapements for releasing the spacers required to justify an assembled line of matrices or type. This selecting plate, so-called, as shown in said prior patents and application, is a plate having a plurality of empirically disposed pins projecting from its top surface: and this selecting plate, and the coöperating mechanism shown in either of said patents or in the pending application are capable of practical use and have been successfully used for the purpose for which they are intended. The said selecting plate is, however, an expensive piece of mechanism, and one which may be easily injured and thereby rendered practically useless.

The primary purpose of the present invention is to provide a cheap and strong substitute for the selecting plate shown and described in said prior patents and application; and also to provide suitable mechanism by which said substitute may be caused to operate in the required manner to serve the purpose for which it is designed.

The present invention in the form shown is designed with a special reference to its employment in justifying mechanism of substantially the specific form shown in my said pending application as a substitute for the spacer selecting and releasing mechanism therein shown.

The invention consists, broadly, of a cylinder carrying a plurality of properly placed peripheral projections, and of the combination therewith of suitable means for turning it and moving it endwise to bring it into proper position, and other mechanism for moving it bodily toward the spacer releasing escapements for the purpose of operating combinations thereof.

The invention also consists in such a cylinder when made up of a plurality of disks carrying appropriate and properly placed combinations of said projections.

It also consists in certain novel constructions and combinations of parts for rendering the primary invention more efficient and practical.

Figure 2:
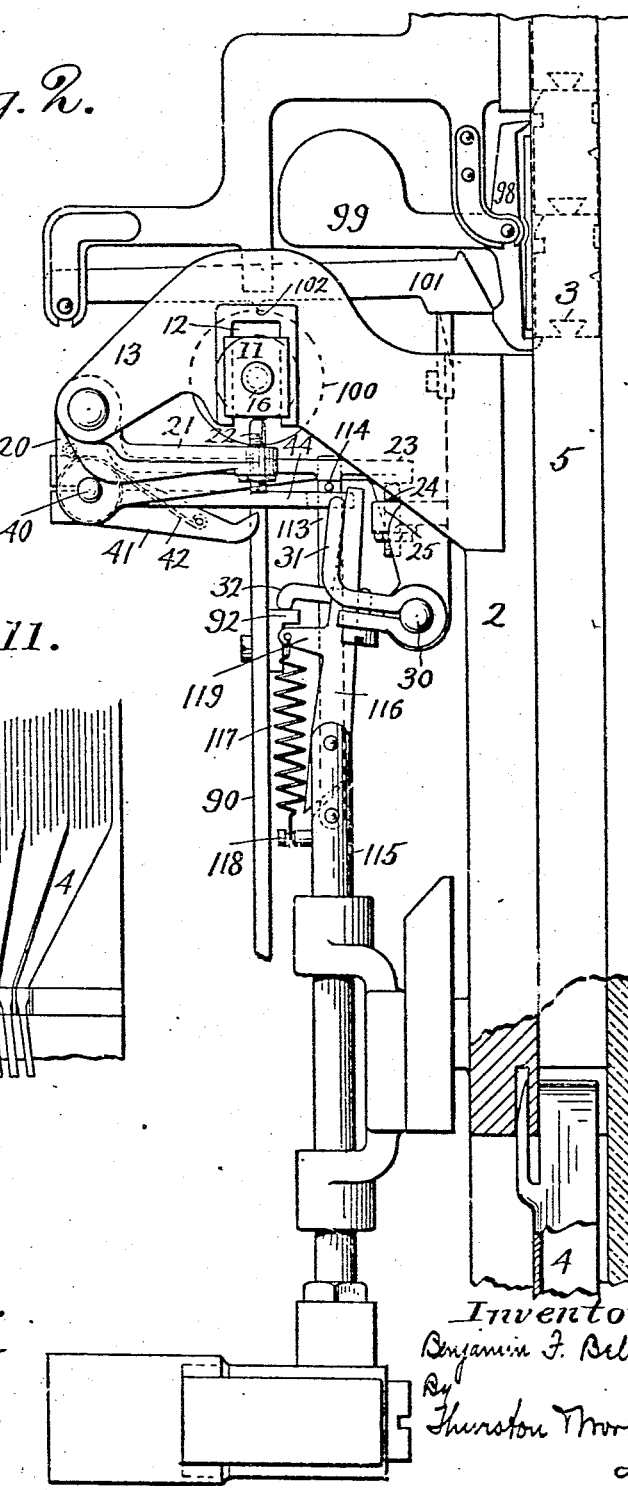
Figure 3:
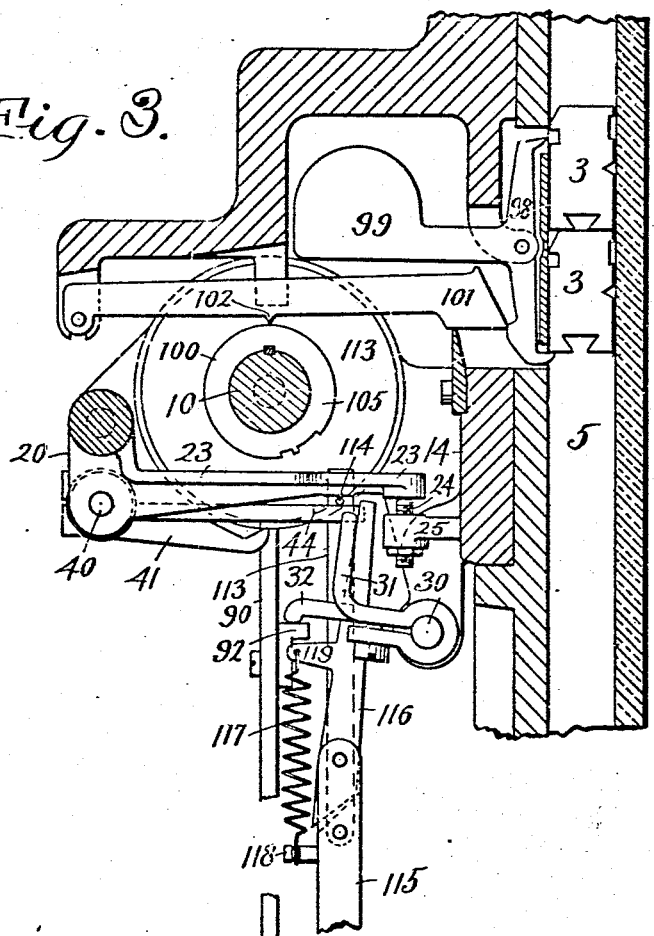
Figure 4:
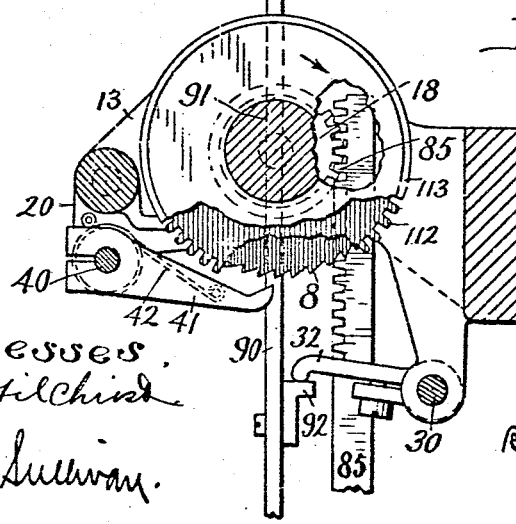
Figure 5:
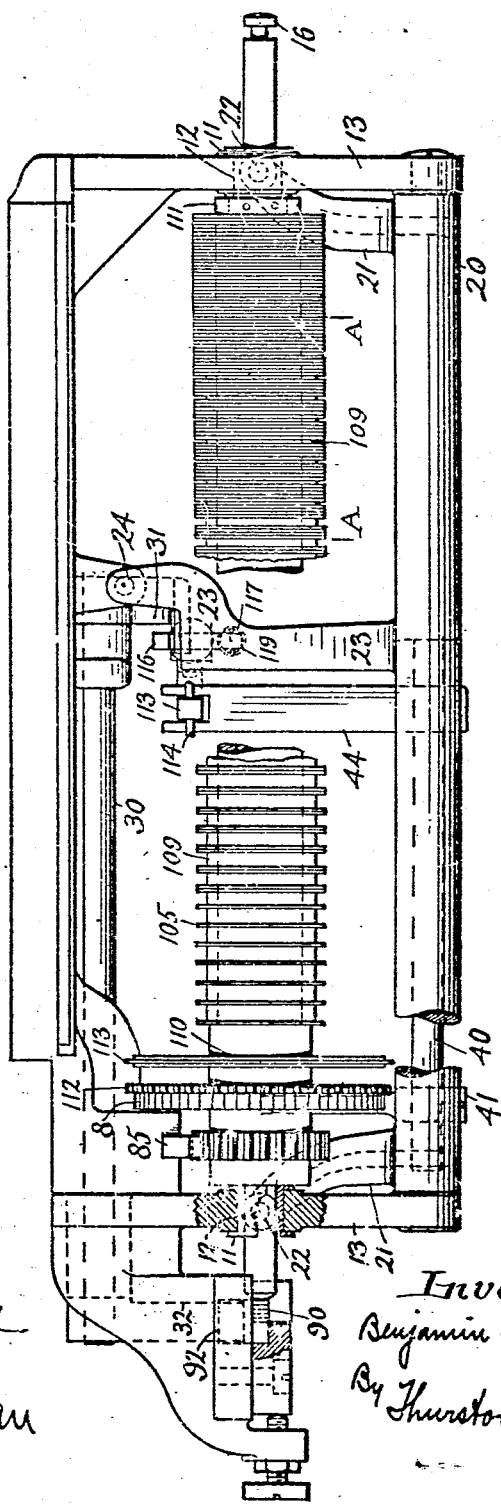
Figure 6:
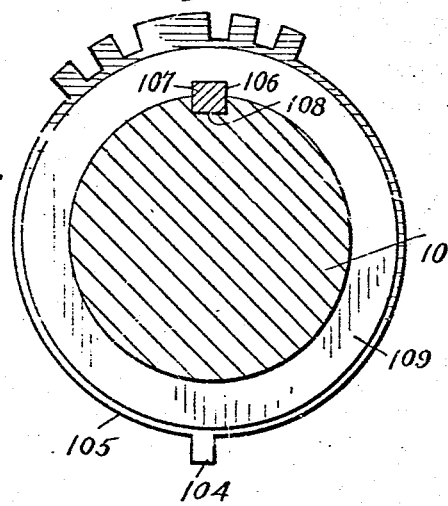
Figure 7:
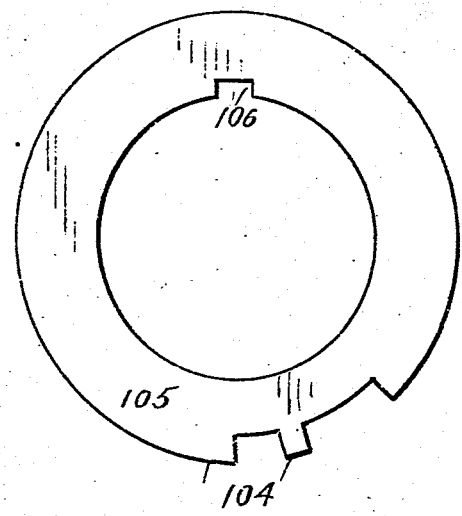
Figure 8:
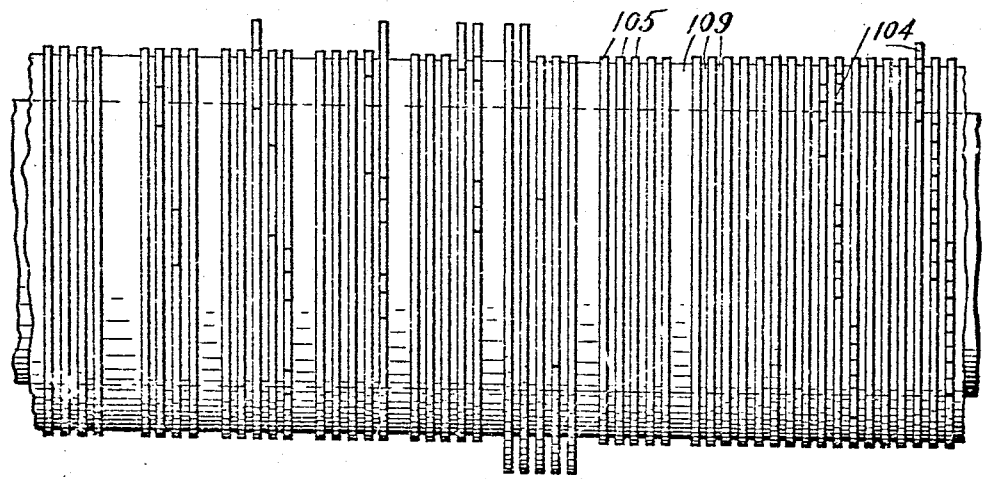
Figure 9:
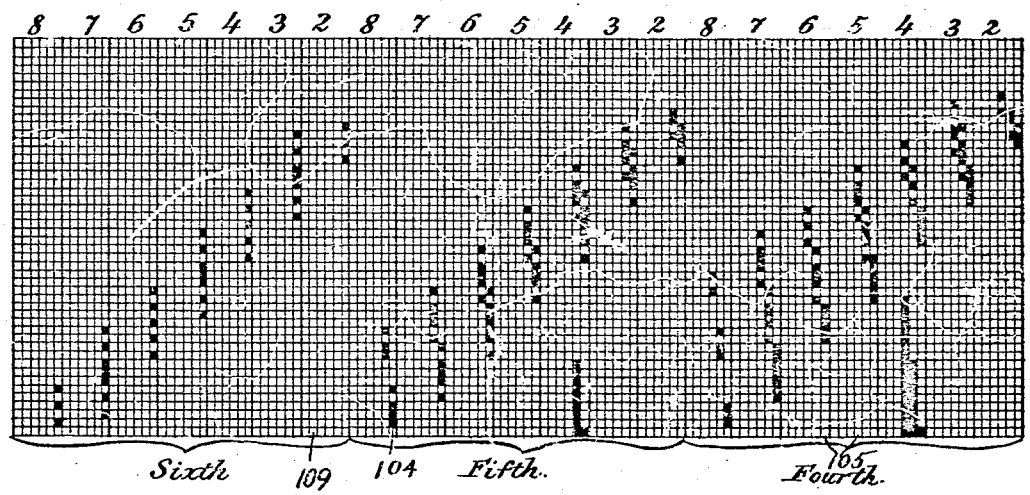
Figure 10:
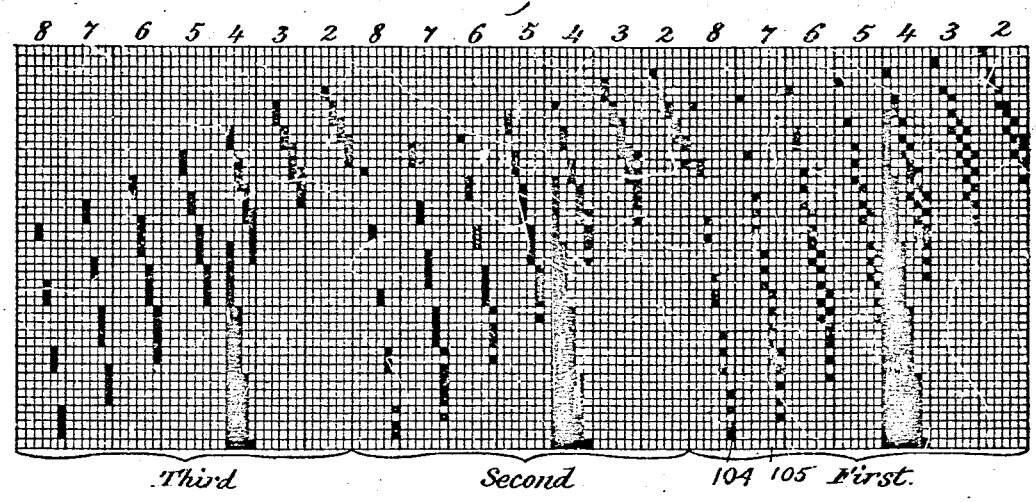

In the drawing, Figure 1 is a rear elevation of the mechanism embodying the invention. Fig. 2 is a side elevation thereof. Fig. 3 is a sectional side elevation in the plane indicated by line C—C of Fig. 1; Fig. 4 is a sectional side elevation of part of said mechanism in the plane indicated by line D—D of Fig. 1. Fig. 5 is a plan view of the selecting cylinder and its operating mechanism. Fig. 6 is a transverse sectional view of said cylinder showing one of the disks secured thereon and provided with spacer operating projections, and also one of the spacing disks. Fig. 7 is a side view of another one of the disks having the peripheral projections. Fig. 8 is a magnified rear elevation of the part of said selecting cylinder which is between the lines A—A on Fig. 5. Figs. 9 and 10 taken together when the left end of Fig. 10 is placed against the right end of Fig. 9, constitute a diagrammatic view of the development of the selecting cylinder. The right end of Fig. 10 is the right end of the cylinder when viewed from the rear of the machine. Fig. 11 is a front view of the lower part of the spacer magazines, their channels and the upper ends of the tubes by which spacers released in the several magazines are to be conveyed to their point of use.

The spacers 3, which are to be selected and released by the mechanism constituting the present invention, are to be stored in a plurality of vertical channels 5, which are parts of the spacer magazines 4. The magazines are to be like the magazines shown in said prior application in that each has a contracted lower discharge mouth through which spacers released from any channel in a magazine will fall into the tube 6 associated with said magazine. In the prior application these magazines are shown to be of various widths and they contain different numbers of spacer channels. The mechanism herein described, however, is intended for use in connection with magazines of the same size, each of which magazines contains seven spacer channels. The width of the magazines and the number of channels therein are matters wholly immaterial to the present invention, although it is, of course, true that in any specific embodiment of the invention there must be a correspondence between the size of the magazines and the number of channels therein, on the one hand, and the disposition of the projections on the selecting member for selecting and operating different combinations of the escapements of the magazine channels.

Associated with each channel is an escapement which may include a pallet lever 98 having a weighted rearwardly projecting operating arm 99. Associated with each of these escapement levers, in operative position and lying directly beneath it, is an operating lever 101 which is pivoted at its rear end to a fixed part of the machine frame. Each of these levers 101 normally occupies a substantially horizontal position, and they all extend over the selecting cylinder 100. And each of these levers has, directly over the center of said cylinder, a downwardly projecting spur or pin 102.

All of the parts above mentioned, except one, viz., the cylinder 100, are in their construction, function and mode of operation substantially like corresponding parts shown and described in my pending application above mentioned.

The selecting cylinder has a shaft 10, which is rotatively mounted in two vertically movable boxes 11. These boxes are mounted, so as to be movable vertically only, in vertical guide ways 12 formed in the rearwardly projecting bracket arms 13 which are fixed to the frame 2 of the machine. Specifically these bracket arms are rigidly connected with a plate 14 which is removably secured to said frame. The shaft 10 is movable endwise in its bearings in these boxes, and the disposition to so move endwise is imparted to it by a spring 15 which is seated in the tubular end of said shaft. A piston 16 is also fitted in this shaft, and the spring acts to thrust this piston outward against a fixture. In the form shown, this fixture is the end of a tubular cap 17, which is screwed into one of the side members of the machine frame 2. This shaft is restrained from moving endwise by the engagement of its opposite end with a vertical movable stepped wedge 91 which is secured to the upper end of a vertically movable rod 90. It is required that this wedge shall move down a distance equal to the length of one of the steps thereon every time a temporary spacer is introduced into a growing line of matrices or type; but this wedge, its rod 90, and the mechanism for moving them may be precisely like corresponding parts shown and fully described in said prior application.

Attached to the shaft 10 is a pinion 18. A vertically movable rod 84 carries at its upper end a rack bar 85 which engages with the pinion 18, whereby, as the rack bar is moved up or down, said pinion, and consequently the shaft 10 and the selecting cylinder 100 secured thereto, will be turned. This vertically movable rod 84 has its counter part in the mechanism of said prior application, and the precise mechanism shown in that prior application may be employed to move this rod upward, whenever a matrix is added to the growing line, a distance proportionate to the width of that addition. The rack bar is capable of a slight upward movement independent of the bar 84,—this motion being possible because the lower end of said rack bar is seated in a socket 86 in the upper end of bar 84. A spring 87 yieldingly holds said rack bar down in said socket. When the two bars 84 and 90 are moved by mechanism like that shown in the said prior application or its equivalent, the cylinder will be moved to the left a definite step every time a temporary spacer is added to the line, and the cylinder will be turned, whenever a matrix or type is added to the line, an angular distance proportionate to the width of the matrix or type so added. The cylinder is made of such circumference, and its operating parts may be so constructed that the cylinder will be caused to make a complete revolution by the addition, to the line, of matrices or type whose aggregate width is equal to the number of units in the greatest line shortage which the mechanism is adapted to justify.

A rocker in the form of a frame 20 is pivoted on a horizontal pivot at its rear end to the rear ends of the bracket arms 13. At the ends of this frame respectively are the forwardly projecting arms 21, each of which carries a vertically adjustable screw,—which screws severally engage with the bottoms of the boxes 11. Near the middle of this frame there is an arm 23 which projects forward under the cylinder, and whose front end rests upon a set screw 24, which is vertically adjustable through a fixed arm 25. The boxes 11, the shaft and the parts secured to said shaft are, therefore, supported by this frame, which is, in turn, prevented from yielding to the force of gravity by the engagement of the arm 23 with the set screw 24. A vertical bar 115 capable of being moved endwise up and down is provided for swinging this frame upward and thereby lifting the selecting cylinder so as to cause it to operate the selected escapements. The mechanism for moving this bar 115 upward may be substantially the same mechanism provided for that purpose which is shown and fully described as the means for raising the corresponding bar 115 of said prior application. This bar in its upward movement engages with the arm 23, above described. It is, however, desirable that the upward movement of the bar 115 shall have no effect in lifting the selecting cylinder until the cylinder has moved at least one step to the left. Therefore, the upper end 116 of the bar 115 is pivoted thereto and is therefore capable of being deflected into an inoperative position. A spring 117 which is stretched between a pin 118 on the bar 115 and a finger 119 on the extension 116 tends to draw said extension into alinement with the bar 115, in which position it is operative. When it is in this position, the upward movement of said bar 115 will swing the frame 20 upward as described; but when the extension 116 is swung out of this alined position, for example, as shown in Figs. 2 and 3, the upper end of the extension is not beneath said arm 23. In the particular construction shown this is because the rear end of the arm 23 is off set. When the extension 116 is alined with bar 115, the upper end of the extension is beneath the straight part of this arm, but when the said extension is drawn forward, as shown, it is not beneath said arm, and, if it be moved up, it simply moves up along side of the offset end of said arm 23.

The extension 116 is held in its inactive position by a curved arm 31 attached to a rock shaft 30 mounted in suitable fixed bearings. Another arm 32 is secured to this rock shaft and it normally rests upon a shoulder 92 upon the bar 90 when said bar is in the position, as shown in Fig. 1, which it occupies before the cylinder 100 has begun its step by step movement to the left. Until that movement has begun, the extension 116 is held out of range of the arm 23, but immediately the arm 90 makes its first downward movement, so as to permit cylinder 100 to move endwise, the shoulder 92 is carried down away from the arm 32, and this permits the rock shaft 30 to be moved. Spring 117, by its action, then draws extension 116 into alinement with bar 115, which is its active position, as above described.

Attached to shaft 10 is a ratchet wheel 8. A dog 41 is provided for engaging with this ratchet. This dog is attached to a rock shaft 40, which is mounted in the frame 20. A spring 42, tends to rock the shaft 40 in the direction to carry the dog into engagement with the ratchet wheel. This movement of the dog, however, is normally prevented by the engagement of an arm 44 (which is attached to the rock shaft and projects forward therefrom) with a pin 114 projecting from an offset rigid upward extension 113 of the bar 115.

When the cylinder 100 has been turned and moved endwise so as to bring it to the proper position for selecting the proper number of spacers of the proper size, the bar 115 is to be moved upward. One of the first results of that movement is to release the arm 44 so as to permit spring 42 to swing the dog 41 into engagement with the ratchet 8. Further upward movement of bar 115 rocks frame 20 through arm 23, and thereby the boxes 11 and consequently shaft 10 and the parts attached thereto are raised. As they are raised the rack 85 by maintaining its engagement with the pinion 18 acts to turn shaft 10 in the direction indicated by the arrow on Fig. 4, and continues to so turn it until further movement is prevented by the engagement of one of the teeth of the ratchet with the end of the dog 41. This brings the cylinder to a fairly accurate angular position, and corrects most slight errors due to imperfect fitting of the teeth of the pinion and rack and some other minor causes which may be existent. The upward movement of the cylinder is continued with the result that it engages with the proper levers 101 associated with the proper number of magazine channels 5 containing spacers of the proper thickness for effecting the justification of the line. The rack 85 offers no obstacle to the continued upward movement of said cylinder, because said rack being yieldingly connected with bar 84 may move up with said cylinder the short distance which may be required. When the bar 115 is again drawn downward and the bars 84 and 90 are caused to resume their initial positions, all of the described parts return to the positions in which they are shown in the drawings; the spring 86 being strong enough to draw the rack bar down to the bottom of the socket 86.

There remains now to be described the particular construction of the cylinder. It is, broadly speaking, such a device as will be produced by rolling a selecting plate having the essential characteristics of the selecting plate shown in the prior application and patents, into the cylindrical form. Figs. 9 and 10 show a development of this cylinder.

The cylinder is divided lengthwise into six equal parts corresponding with the number of spacer holding magazines and corresponding consequently with the number of justifying spacers which may be introduced into a line of matrices or type to justify the same. Below Figs. 9 and 10 are brackets drawn to show the extent of these primary divisions of the cylinder which are hereinafter termed magazine sections. The words first, second, third, fourth, fifth and sixth below these brackets will be used in order to distinguish one from another. The "first" magazine section is that which is associated with the left hand magazine when viewed from the front of the machine, and with the tube 4 associated therewith,—this being the tube which is first moved forward so as to bring the temporary spacer attached to its lower end into the growing line. Each of these magazine sections, is divided into seven equal parts corresponding with the number of spacer channels in each magazine, and each one of these small sub-divisions, which may be called channel sections, is associated with the escapement mechanism of one of said channels. The different channels in the several magazines are intended to contain spacers of different widths. The figures placed above the different channel sections of the cylinder, represented diagrammatically in Figs. 9 and 10, show the width, in spacer units, of the spacers contained in the associated channels. Each of these channel sections is again sub-divided into six equal spaces, which correspond in width to the step by step endwise movements of the cylinder controlled by the stepped wedge 91. The cylinder is divided circumferentially into as many equal sections as there are units of spaces in the line shortage, which the described mechanism is adapted to fill up, by the addition of justifying spaces. There are peripheral projections 104 empirically placed in the various squares formed by these hypothetical lengthwise and circumferential sub-divisions. Some of these projections are circumferentially long, extending almost entirely around the cylinder. Some of them are short in the sense that they extend circumferentially only the distance of one square. The position and length of these projections is indicated by the black blocking on Figs. 9 and 10. Some of these small lengthwise sub-divisions have no projections at all in them. In fact, all of the channel divisions associated with the left hand magazine (viewed from the rear of the machine) have projections in only their right end sub-division. The channel divisions associated with the next magazine have these projections only in two right hand sub-divisions; and so on, as shown.

It will be remembered that whenever a temporary spacer is added to the growing line, the cylinder moves one step to the left (as in Figs. 9 and 10). This brings the left small sub-division of each channel division under the associated escapement operating levers 101. But when the cylinder has made only one of said movements, only one permanent spacer is required: and that must be taken from one of the channels of the first magazine. Therefore, the left hand small sub-divisions of the channel divisions of the first magazine must be provided with suitably placed projections 104. But the left hand small sub-divisions of all of the channel divisions in the other magazine sections must not have any of those projections 104, or otherwise spaces might be released from some magazine other than the first. When the cylinder has moved two steps to the left, the next small sub-division of all the channel divisions are brought beneath the escapement operating levers. But since spacers are required from only the first and second magazines, these particular small sub-divisions of the channel divisions of the first two magazine sections have projections 104, while those of the other magazines have not. It is apparent therefore that these escapement operating projections should be provided on only the right hand sub-divisions of the channel divisions of the sixth magazine, in the two right hand sub-divisions in the fifth magazine, and so on.

In making up the cylinder, disks 105 are employed, corresponding with the smallest lengthwise sub-divisions of the cylinder, as described. On each of these disks are the required peripheral projection or projections 104 corresponding in position and circumferential length with the requirements, as indicated in Figs. 9 and 10. Each of these disks is provided with a suitably disposed key-way 106 for engagement with a key 107 which also lies in the longitudinal key way 108 in the shaft 10. The key ways in the disks are so placed that when the disks are placed upon the shaft in engagement with the key all of the disks shall occupy the required angular position relative to each other. There are 48 different varieties of disks required where there are one hundred and forty seven disks required with spacer operating projections. The disks which are alike in respect to the number and relative position and size of the projections are differentiated from each other upon the cylinder by their angular position upon the shaft, as determined by the key way. Spacing disks 109 are interposed between the disks having projections. These spacing disks are of various widths as required.

There are many thin spacing disks, namely, those which lie between two of the disks 105 which are placed in adjacent small sub-divisions of the same channel division. But, as will be understood from the foregoing description explaining why in some channel divisions six disks 105 are required, as in the channel sections of the first magazine, while in other channel divisions only one disk 105 is required, as, for example, in the channel sections of the sixth magazine, there is considerable space to be filled by spacing disks 109 between the disks 105 of one channel division and the disks 105 of another channel division. It is in order to fill these spaces and properly space the disks 105 that the spacing disks 109 are made of various widths as shown. When all of these disks are arranged upon the shaft they are compacted together and prevented from endwise displacement by bearing at one end against a shoulder 110 on the shaft and at the other end by a nut 111 which screws onto said shaft. It is quite clear that this manner of making the selecting device very greatly reduces the cost thereof, as compared with such a selecting plate, as is shown in my said prior patents and application, and as compared even with the cylinder in which the projections are separately secured upon its periphery.

A cylinder having the peripheral projections disposed and arranged as shown and described will correspond in function to the selecting plate of said prior application and patent. The step by step lengthwise movement of the cylinder will bring different small sub-divisions thereof beneath the escapement operating devices with which they are associated. The turning of the cylinder brings different combinations of said escapements beneath the different escapement operating devices, just as the rearward movement of the selecting plate does in the prior construction referred to.

The present invention is not at all dependent upon the mechanism provided for imparting to the bars 84, 90 and 115 their vertical movements. They may, however, be moved, as before stated, by precisely the same mechanism employed in the prior constructions referred to for moving corresponding vertical bars. The movement of the bars 84 and 90, however, control the movement of the cylinder circumferentially and lengthwise and bring it to the required position. The upward movement of the bar 115 lifts the support for the cylinder, as before described, and causes peripheral projections thereon to engage with the escapement operating devices 101 to impart the required movement thereto. Extreme accuracy in the positioning of this cylinder is required. The dog 41 by its coöperation with the ratchet 18 comes very close to accurately positioning the cylinder with respect to its angular position, and the stepped wedge 91 comes very close to accurately positioning the cylinder with respect to endwise movement. It is, however, thought desirable that there should be certain additional devices for insuring the accurate positioning of the cylinder. To this end a toothed wheel 112 and a thin disk 113 are secured to the shaft 10. Above the toothed wheel and disk is a block 114 fixed to the framework of the machine having over the toothed wheel a downwardly projecting spur 116. This block also has six vertical kerfs or grooves 117 adapted to receive the V-shaped edge of the disk. When, therefore, the cylinder is lifted, some interdental space in said toothed wheel embraces said spur 116, and the disk 113 goes into one or the other of said grooves 117, and thereby, if required, the cylinder is turned or moved endwise very short distances, to bring it into an absolutely accurate position. If, when the cylinder is moved upward, the disk 113 is not squarely in line with one of the kerfs 117, the V-shaped edge of said disk by engaging with the sides of the kerf will tend to move the cylinder a very short distance endwise. Similarly the tooth 116 will, by engaging with the sides of the interdental space on the toothed wheel 112, cause the cylinder to turn in one direction or the other a very short distance, provided said tooth 116 can not otherwise go squarely into said interdental space.

Having described my invention, I claim:

1. In justifying mechanism, the combination with a plurality of escapement operating devices, of a cylinder having a plurality of peripheral projections for engagement with said devices, means for turning the cylinder, means for moving it endwise by steps, and means for moving it bodily toward said escapement operating devices.

2. In a justifying mechanism, the combination of a plurality of escapement operating devices, a cylinder carrying a plurality of peripheral projections for engagement with said devices, bearing boxes for said cylinder, vertical guide-ways for said boxes, a movable support for said boxes, means for turning said cylinder in its bearings, means for moving it by steps lengthwise in its bearings, and mechanism for moving the bearing boxes vertically to carry said cylinder toward said escapement operating devices.

3. In justifying mechanism, the combination of a plurality of escapement operating devices, a cylinder having a plurality of peripheral projections for engagement with escapement operating devices, bearing boxes in which said cylinder is mounted and in which it is movable endwise, a rocker having two arms which engage beneath and support said rocker, means for limiting the downward swing of said rocker, and a vertically movable bar for swinging said rocker upward.

4. In justifying mechanism, the combination of a plurality of escapement operating devices, a cylinder arranged beneath the same and provided with a plurality of peripheral projections, a pinion rigidly connected with said cylinder, a vertical movable rack bar engaging with said pinion, means for moving the cylinder endwise, means for limiting said endwise movement, and means for moving the cylinder bodily toward the escapement operating devices.

5. In justifying mechanism, the combination of a plurality of escapement operating devices, a cylinder arranged beneath the same and provided with a plurality of peripheral projections, a pinion rigidly connected with said cylinder, a vertical movable rack bar in engagement with said pinion, means for moving the cylinder endwise, means for limiting said endwise movement, means for moving the cylinder bodily toward the escapement operating devices, a ratchet wheel rigidly secured to said cylinder, a spring-actuated dog adapted for engagement with said ratchet.

6. In justifying mechanism, the combination of a plurality of escapement operating devices, two vertically movable bearing boxes, a shaft mounted therein, a cylinder secured to said shaft and provided with a plurality of peripheral projections adapted for engagement with said escapement operating devices, a pinion secured to said shaft, a vertically movable rack bar engaging therewith, a rock shaft, a dog secured thereto, a ratchet secured to the cylinder shaft and adapted to be engaged by said dog, means for imparting a step by step endwise movement to said shaft, operating means for moving said bearing boxes vertically, and mechanism controlled by said operating means for normally withholding the dog from said ratchet and for permitting it to move into engagement therewith before the upward movement of said box is completed.

7. In justifying mechanism, a cylinder comprising a shaft, a plurality of disks fixed thereon and provided with properly disposed peripheral projections, and intermediate spacing disks.

8. In justifying mechanism, a cylinder comprising a shaft and plurality of disks fixed thereon, which disks are all of the same thickness and diameter, and are provided with properly disposed peripheral projections, and intermediate spacing disks.

9. In justifying mechanism, a cylinder comprising a shaft having a longitudinal keyway, and a plurality of disks fitted thereon, each having properly disposed peripheral projections, and a properly disposed keyway, and intermediate spacing disks also provided with a keyway, combined with a key engaging in said keyways, and means preventing endwise movement of the disks upon said shaft.

10. In justifying mechanism, the combination of a plurality of escapement operating devices, a cylinder having a plurality of peripheral projections for engagement with said escapement operating devices, bearing boxes in which said cylinder is mounted and in which it is movable endwise, vertical guide ways for said bearing boxes, means for moving the cylinder endwise by steps, means for turning said cylinder, supports for said boxes, means for moving said supports vertically to carry the cylinder toward the escapement operating devices and to cause certain projections upon the cylinder to engage with and move corresponding escapement operating devices.

11. In justifying mechanism, the combination of a plurality of escapement operating devices, two fixed arms, each provided with a vertical guide-way, a bearing box mounted in each guide way, a shaft mounted in said boxes and capable of moving endwise therein, a cylinder rigid with said shaft and provided with a plurality of peripheral projections adapted for engagement with the escapement operating devices, a rocker, two arms secured thereto which severally project beneath and engage with and support said bearing boxes, means for turning said cylinder, means for moving said shaft by steps endwise in its bearings, and a vertically movable bar adapted to engage with an arm secured to said rocker whereby the same may be rocked and the two bearing boxes and the parts supported thereby may be moved vertically.

12. In justifying mechanism, the combination of a plurality of escapement operating devices, and a movable selecting member thereunder provided with a plurality of escapement operating projections a vertically movable support for said member, a vertically movable rod adapted to engage with and move said support upward,—said rod having a deflectable upper end capable of being withdrawn to a position where it will not engage with said support, a vertically movable stepped wedge for limiting endwise movement of said selecting member, a shoulder moving with said wedge, and mechanism operated by said shoulder for withdrawing deflectable upper end of said rod into an inoperative position.

13. In justifying mechanism, the combination of a cylinder having a plurality of peripheral projections, bearing boxes in which the cylinder is rotatably mounted, means for rotating the cylinder, a spring for moving the cylinder endwise, a movable wedge controlling said endwise movement, a vertically movable bar adapted to move said bearing boxes upward, and mechanism operated by a part rigidly connected with said stepped wedge for rendering said vertically movable bar incapable of moving said cylinder and boxes upward.

14. In justifying mechanism, the combination of a cylinder having a plurality of peripheral projections, bearing boxes in which said cylinder is rotatably mounted and in which it is capable of moving endwise, means for rotating the cylinder, a spring for moving it endwise in its bearings, a movable stepped wedge for controlling the endwise movement of said cylinder a pivoted rocker having an operating arm and two arms which respectively engage beneath and support said bearing boxes, a fixed support upon which said operating arm normally rests, a vertically movable bar having a deflectable upper end which may occupy a position beneath said operating arm or may be withdrawn from such position, and means controlled by said stepped wedge for so withdrawing the upper end of said rod, whereby when the bar moves upward it will not engage with said operating arm.

15. In justifying mechanism, the combination of a cylinder having a plurality of peripheral projections, bearing boxes in which it is rotatively mounted and in which it is capable of moving endwise, means for rotating the cylinder, means for moving it endwise by steps, a pivoted rocker having an operating arm and two arms which respectively engage beneath and support said bearing boxes, a fixed support upon which said operating arm normally rests, and a vertically movable bar whose upper end is adapted to engage with said operating arm and lift it and thereby to move the cylinder upward.

16. In justifying mechanism, the combination of a cylinder having a plurality of peripheral projections, bearing boxes in which it is rotatively mounted and in which it is capable of moving endwise, means for rotating the cylinder, means for moving it endwise by steps, a pivoted rocker having an operating arm and two arms which respectively engage beneath and support said bearing boxes, a fixed support upon which said operating arm normally rests, a vertically movable bar provided with a pivoted upper end which is normally below a part of said operating arm, a vertically movable stepped wedge controlling the endwise movement of the cylinder, a vertically movable bar to which said stepped wedge is connected, and means operated by said bar for drawing said pivoted upper end from beneath said operating arm.

17. In justifying mechanism, the combination of a cylinder, having a plurality of peripheral projections, bearing boxes in which it is rotatively mounted and in which it is capable of moving endwise, means for rotating the cylinder, means for moving it endwise by steps, a pivoted rocker having an operating arm and two arms which respectively engage beneath and support said bearing boxes, a fixed support upon which said operating arm normally rests, a rock shaft having two arms one of which is adapted to engage with the pivoted upper end of said vertically movable bar and move it to an inoperative position, and the other arm being the operating arm, a vertically movable stepped wedge controlling the endwise movement of the cylinder, a bar secured thereto and carrying a shoulder which engages with the operating arm of said rock shaft, and means for drawing the pivoted upper end of the vertically movable bar into alinement with the operating arm of the rocker.

18. In justifying mechanism the combination of a cylinder having a plurality of properly disposed peripheral projections, bearing boxes in which said cylinder is rotatably mounted and in which it may be moved endwise, a rocker having two arms which respectively engage with and support said bearing boxes, a ratchet secured to said cylinder, a spring-actuated rock shaft, a dog secured thereto and adapted to engage with said ratchet, an arm secured to said rock shaft, and a vertically movable bar having a shoulder adapted to engage with the arm connected with the rock shaft whereby the dog is normally held out of engagement with said ratchet.

19. In justifying mechanism, the combination of a cylinder having a plurality of properly placed peripheral projections, a spring for moving it endwise, a vertically movable stepped wedge controlling said endwise movements, vertically moving bearing boxes in which said cylinder is rotatably mounted, a vertically movable support for said bearing boxes, a vertically movable bar for operating said support provided with a pivoted upper end, an arm withdrawing said upper end from the operating position, an operating arm connected with said withdrawing means and adapted to be engaged by a rigid connection with said stepped wedge whereby the withdrawing device is moved into the withholding position and held therein until the stepped wedge has moved downward the distance of one step.

20. In justifying mechanism, the combination of a cylinder having a plurality of peripheral projections, means for turning the cylinder, means for moving it endwise by steps, means for moving it upward, a disk fixed to said cylinder, and a fixed block containing slots adapted to receive said disk when the cylinder is moved upward and thereby to accurately position said cylinder with respect to endwise movement.

21. In justifying mechanism, the combination of a cylinder having a plurality of peripheral projections, means for turning the cylinder, means for moving it endwise by steps, means for moving it bodily upward, a toothed wheel fixed to said cylinder, and a fixed tooth located above the same, whereby when the cylinder is moved upward one of the interdental spaces of said toothed wheel will embrace said tooth and thereby accurately position said cylinder with respect to rotary motion.

In testimony whereof, I hereunto affix my signature in the presence of two witnesses.

BENJAMIN F. BELLOWS.

Witnesses:
E. B. GILCHRIST,
H. R. SULLIVAN.